(12) United States Patent
Yokobori

(10) Patent No.: US 8,358,950 B2

(45) Date of Patent: Jan. 22, 2013

(54) IMAGE FORMING SYSTEM AND METHOD TO TEMPORARILY STOP AN IMAGE FORMING PROCESS WHEN REACHING THE NUMBER OF UNITS SPECIFIED BY A USER, IMPROVING WORKING EFFICIENCY

(75) Inventor: Jun Yokobori, Sagamihara (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 797 days.

(21) Appl. No.: 12/476,639

(22) Filed: Jun. 2, 2009

(65) Prior Publication Data

US 2009/0310159 A1 Dec. 17, 2009

(30) Foreign Application Priority Data

Jun. 17, 2008 (JP) ................................ 2008-157577

(51) Int. Cl.
*G03G 15/00* (2006.01)
*G06K 1/00* (2006.01)

(52) U.S. Cl. ......... 399/82; 358/1.9; 358/1.15; 358/1.12; 358/1.13; 358/1.14; 358/1.16; 399/23; 399/43; 399/53; 399/81; 399/85; 399/88; 399/361; 399/405

(58) Field of Classification Search ........................ None
See application file for complete search history.

(56) References Cited

U.S. PATENT DOCUMENTS

| | | | | |
|---|---|---|---|---|
| 4,417,806 | A * | 11/1983 | Tani et al. | 399/396 |
| 5,263,697 | A | 11/1993 | Yamazaki et al. | |
| 5,357,329 | A * | 10/1994 | Ariyama et al. | 399/16 |
| 5,721,621 | A * | 2/1998 | Komaki et al. | 358/296 |
| 5,987,227 | A * | 11/1999 | Endo et al. | 358/1.13 |
| 6,462,830 | B1 * | 10/2002 | Negishi | 358/1.12 |
| 7,440,709 | B2 * | 10/2008 | Mima et al. | 399/82 |
| 2007/0103702 | A1 * | 5/2007 | Yamamoto et al. | 358/1.4 |

FOREIGN PATENT DOCUMENTS

| | | |
|---|---|---|
| JP | 09-006561 | 1/1997 |
| JP | 09-073205 A | 3/1997 |
| JP | 2000-255889 | 9/2000 |
| JP | 2003-002526 | 1/2003 |
| JP | 2003-095519 A | 4/2003 |
| JP | 2004-075236 | 3/2004 |
| JP | 2007-045030 | 2/2007 |

OTHER PUBLICATIONS

Notification of Reasons for Refusal issued in the corresponding Japanese Patent Application No. 2008-157577 dated Apr. 20, 2010, and an English Translation thereof.

(Continued)

*Primary Examiner* — Steven Kau

(74) *Attorney, Agent, or Firm* — Buchanan Ingersoll & Rooney PC

(57) ABSTRACT

Disclosed an image forming system including: an image forming section to perform an image forming processing to form an image on a sheet to eject the image-formed sheet to an sheet ejection section; a control section to control the image forming processing by the image forming section; a specify section to specify the number of units for stop in a temporary stop mode in which the image forming processing by the image forming section is temporarily stopped, wherein the control section allows the image forming section to stop the image forming processing when the image forming processing by the image forming section reaches the number of units for stop specified with the specify section.

8 Claims, 11 Drawing Sheets

OTHER PUBLICATIONS

Notification of Reasons for Refusal dated Sep. 7, 2010, issued in the corresponding Japanese Patent Application No. 2008-157577, and an English Translation thereof.
Office Action dated Feb. 13, 2012, issued in the corresponding European Patent Application No. 09 160 996.6-2216. (3 pages).
European Search Report issued in corresponding Application No. 09160996.6-2209 dated Oct. 2, 2009.
Office Action from Chinese Patent Office dated Aug. 28, 2012, issued in corresponding Chinese Patent Application No. 200910148989.X, with English translation thereof.

* cited by examiner

IMAGE FORMING SYSTEM AND METHOD TO TEMPORARILY STOP AN IMAGE FORMING PROCESS WHEN REACHING THE NUMBER OF UNITS SPECIFIED BY A USER, IMPROVING WORKING EFFICIENCY

BACKGROUND

1. Field of the Invention

The present invention relates to an image forming system and an image forming method.

2. Description of Related Art

When finishing processing is executed while ejecting a large amount of sheets in an image forming system, if a sheet is tried to be removed without stopping the processing, there is a possibility that the ejecting sheets are touched by a hand so that a paging disorder occurs. Therefore, it is necessary to stop the processing to remove the ejected sheet after sheet ejection of the number of sets/sheets/jobs predetermined for performing the finishing processing.

Consequently, there has been proposed an image forming apparatus which includes an interleaving sheet mode in which a sheet is inserted to a given position of one sheet bundle, and which temporarily stops an image forming operation whenever the one sheet bundle including the inserted sheet is ejected, in order to enable confirming the created sheet bundle (for example, see Japanese Patent Application Laid-Open Publication No. 2003-95519).

In addition, there has been proposed a sheet finishing apparatus which temporarily stops sheet finishing processing to enable taking out the sheet when a user depresses a taking-out request switch even while the finishing processing is executed (for example, see Japanese Patent Application Laid-Open Publication No. Hei 09-73205).

However, by the apparatus of Japanese Patent Application Laid-Open Publication No. 2003-95519, though it is possible to temporarily stop the operation per the one bundle, the extra interleaving sheet needs to be inserted and thereby incurs waste. Moreover, when the inserted interleaving sheet is unnecessary, an additional work to remove the interleaving sheet from each of the sheet bundles has to be performed. Furthermore, a position to which the sheet is inserted is limited to a given page break within one job, and a user can not arbitrarily stop the processing per the desired number of sets/sheets/jobs.

Furthermore, though the apparatus of Japanese Patent Application Laid-Open Publication No. Hei 09-73205 can achieve an object to temporarily stop the apparatus for removing the sheet bundle, a user needs to look for a right time for the operation as seeing a display on an operation panel. Therefore, it is difficult for a user to depress the taking-out request switch at a proper timing to stop the processing per the accurate number of sets/sheets/jobs.

SUMMARY

An object of the present invention is to provide an image forming system and an image forming method to temporarily stop an image forming processing when reaching the number of units specified by a user so as to reduce user's burden and to improve working efficiency.

In order to achieve the above-described object, according to a first aspect of the present invention, there is provided an image forming system including: an image forming section to perform an image forming processing to form an image on a sheet to eject the image-formed sheet to an sheet ejection section; a control section to control the image forming processing by the image forming section; a specify section to specify the number of units for stop in a temporary stop mode in which the image forming processing by the image forming section is temporarily stopped, wherein the control section allows the image forming section to stop the image forming processing when the image forming processing by the image forming section reaches the number of units for stop specified with the specify section.

Preferably, the number of units for stop specified with the specify section is at least one of the number of sheets, the number of sets, and the number of jobs.

Preferably, the control section judges whether or not a predetermined condition has been met when the number of units for stop specified with the specify section is the number of jobs, and when the control section judges that the predetermined condition has been met, the control section stops the image forming processing by the image forming section after ejecting the sheet of current job and resets a count of the number of jobs until the stop time, and the predetermined condition is at least one of the following conditions: (a) a different number of jobs is specified as the number of units for stop with the specify section; (b) release of the temporary stop mode has been instructed; (c) a next job is a job for different sheet size; (d) a next job is a job for different sheet ejection mode; and (e) a next job is a job for different sheet ejection destination.

Preferably, the image forming system further includes: a detection section to detect that the sheet has been removed from the sheet ejection section; and a setting section for setting a predetermined time between detection by the detection section and restart of the image forming processing, wherein the control section restarts the image forming processing by the image forming section when the predetermined time set with the setting section has passed since the detection time of the detection section, and stops again the image forming processing by the image forming section when the image forming processing reaches the number of units for stop specified with the specify section after the restart.

Preferably, the image forming system further includes: a detection section to detect that the sheet has been removed from the sheet ejection section; and an instruction section to instruct the image forming section to restart the image forming processing, wherein the control section restarts the image forming processing by the image forming section when the detection section detects that the sheet has been remove and the instruction section instructs the image forming section to restart the image forming processing, and stops again the image forming processing by the image forming section when the image forming processing reaches the number of units for stop specified with the specify section after the restart.

Preferably, the image forming system further includes: a detection section to detect that the sheet has been removed from the sheet ejection section; an instruction section to instruct the image forming section to restart the image forming processing; a first setting section for setting a predetermined time between detection by the detection section and restart of the image forming processing; and a second setting section for setting any of a first control by which the image forming section restarts the image forming processing when a predetermined time set with the first setting section has passed, and a second control by which the image forming section restarts the image forming processing when the detection section detects that the sheet has been removed and the instruction section instructs the image forming section to restart the image forming processing, wherein in the case that the first control is set with the second setting section, the control section restarts the image forming processing by the image forming section when the predetermined time set with the first setting section has passed since the detection time of the detection section, in the case that the second control is set with the second setting section, the control section restarts the image forming processing by the image forming section when the detection section detects that the sheet has been removed and the instruction section instructs the image forming section to restart the image forming processing, and after the restart of the image forming processing by the image forming section, the control section allows the image forming section to stop again the image forming processing when the image forming processing reaches the number of units for stop specified with the specify section.

In order to achieve the above-described object, according to a second aspect of the present invention, there is provided an image forming method including the steps of: performing an image forming processing to form an image on a sheet to eject the image-formed sheet to the sheet ejection section, specifying the number of units for stop in a temporary stop mode in which the image forming processing is temporarily stopped, controlling the image forming processing to stop when the image forming processing reaches the number of units for stop specified in the specifying step.

Preferably, the number of units for stop specified in the specifying step is at least one of the number of sheets, the number of sets, and the number of jobs.

Preferably, in the controlling step, it is judged whether or not a predetermined condition has been met when the number of units for stop specified in the specifying step is the number of jobs, and when it is judged that the predetermined condition has been met, the image forming processing is stopped after ejecting the sheet of current job and a count of the number of jobs until the stop time is reset, and the predetermined condition is at least one of the following conditions: (a) a different number of jobs is specified as the number of units for stop in the specifying step; (b) release of the temporary stop mode has been instructed; (c) a next job is a job for different sheet size; (d) a next job is a job for different sheet ejection mode; and (e) a next job is a job for different sheet ejection destination.

Preferably, the image forming method further includes the steps of: detecting that the sheet has been removed from the sheet ejection section; and setting a predetermined time between detection in the detecting step and restart of the image forming processing, wherein in the controlling step, the image forming processing restarts when the predetermined time set in the setting step has passed since the detection time in the detecting step, and the image forming processing is stopped again when the image forming processing reaches the number of units for stop specified in the specifying step after the restart.

Preferably, the image forming method further includes the steps of: detecting that the sheet has been removed from the sheet ejection section; and instructing restart of the image forming processing, wherein in the controlling step, the image forming processing restarts when it is detected that the sheet has been remove in the detecting step and the image forming processing is instructed to restart in the instructing step, and the image forming processing is stopped again when the image forming processing reaches the number of units for stop specified in the specifying step after the restart.

Preferably, the image forming method further includes the steps of: detecting that the sheet has been removed from the sheet ejection section; instructing restart of the image forming processing; firstly setting a predetermined time between detection in the detecting step and restart of the image forming processing; secondly setting any of a first control by which the image forming processing restarts when the predetermined time set in the firstly setting step has passed since the detection time in the detecting step, and a second control by which the image forming processing restarts when it is detected that the sheet has been removed in the detecting step and the image forming processing is instructed to restart in the instructing step, wherein in the controlling step, in the case that the first control is set in the secondary setting step, the image forming processing restarts when the predetermined time set in the firstly setting step has passed since the detection time in the detecting step, in the case that the second control is set in the secondary setting step, the image forming processing restarts when it is detected that the sheet has been removed in the detecting step and the image forming processing is instructed to restart in the instructing step, and after the restart of the image forming processing, the image forming processing is stopped again when the image forming processing reaches the number of units for stop specified in the specifying step.

According to the present invention, user's burden is reduced, and working efficiency can be improved. Moreover, since the image forming processing is stopped when reaching the specified number of units for stop, paging disorder due to touch to the sheet during the sheet ejection can be prevented and working efficiency in the case performing the work of finishing step per certain number of units and the like can be improved. It also becomes possible to confirm the image on the ejected sheet at regular intervals.

In addition to the above advantages, it becomes possible to stop the image forming processing per the number of various units depending on user's needs.

In addition to the above advantages, even in the case of the temporary stop mode in which the temporary stop is performed per the specified number of jobs, it becomes possible to temporarily stop the image forming processing at arbitrary timing for a user so that usability is further improved.

In addition to the above advantages, the image forming processing can restart without an operation for restarting the image forming processing so that user's burden can be reduced. Moreover, since the predetermined time between removal of the sheet from the sheet ejection section and restart the image forming processing can be set, usability is improved. Furthermore, since after restarting the image forming processing, when reaching the specified number of units for stop, the image forming processing is stopped again, it becomes possible to repeat starting and stopping of the image forming processing per the number of units for stop so that usability is improved.

In addition to the above advantages, the image forming processing can restart at an arbitrary timing so that usability is further improved. Moreover, the image forming processing is stopped again when reaching the specified number of units for stop after restarting the image forming processing, it becomes possible to repeat the start and stop of the image forming processing per the number of units for stop so that usability is improved.

Furthermore, in addition to the above advantages, since a user can set which of the first control and the second control is performed, a high degree of usability for a user is realized. Moreover, since the image forming processing is stopped again when reaching the specified number of units for stop after restarting the image forming processing, it becomes possible to repeat starting and stopping of the image forming processing per the number of units for stop so that usability is improved.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

DETAILED DESCRIPTION OF THE PREFERRED EMBODIMENT

An embodiment of an image forming system 1 according to the present invention will be described with reference to the drawings. However, the scope of the present invention is not limited to illustrated examples.

Figure 1:
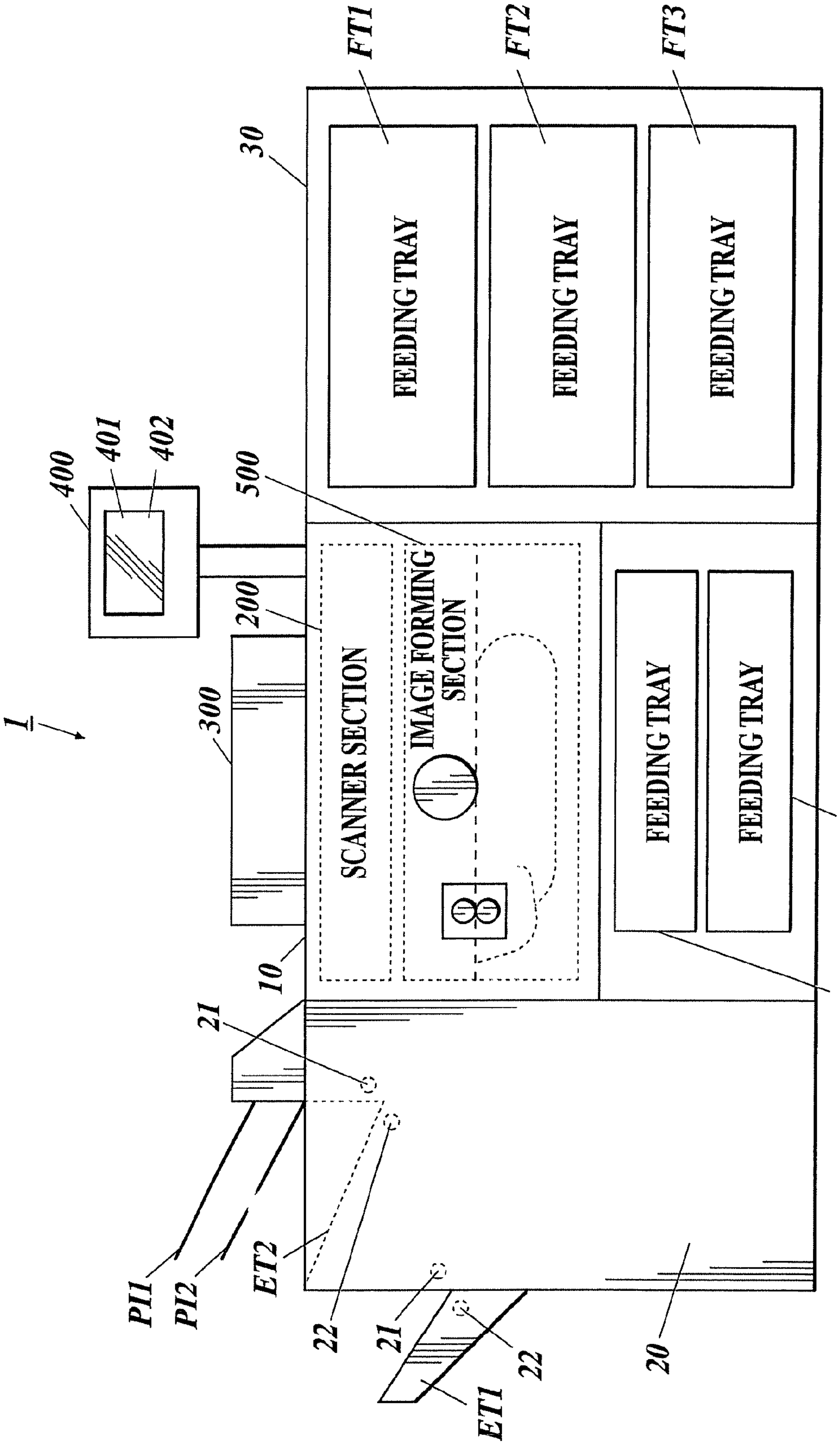
FIG. 1 is a front elevation diagram showing a schematic configuration of an image forming system according to the present embodiment.

FIG. 1 is a front elevation diagram showing a schematic configuration of the image forming system 1 according to the present embodiment.

As shown in FIG. 1, the image forming system 1 according to the embodiment includes: a body section 10; a sheet ejection section 20 optionally connected to the body section 10; and a large capacity tray unit 30. The sheet ejection section 20 is equipped with a not-shown finishing mechanism and an ejecting tray ET (first ejecting tray ET, second ejecting tray ET). The large capacity tray unit 30 is equipped with feeding trays FT1-FT3 including a not-shown feeding mechanism.

As shown in FIG. 1, the body section 10 includes: a scanner section 200; an Auto Document Feeder (ADF) section 300; an operation display section 400; an image forming section 500; and feeding trays FT4, FT5.

In image forming processing, for example, a document placed on a document tray of the ADF section 300 is conveyed to a contact glass as a reading position of the scanner section 200, and an optical system of the scanner 200 reads an image of the document there. Here, the image includes not only image data such as a graphic and photograph also text data such as a character and mark.

The image (analog image signal) read by the scanner section 200 is output to a status management section 100 to be hereinafter described, subjected to A/D conversion in the status management section 100, and subjected to various image processing to be output to the image forming section 500. Then, the image forming section 500 forms an image based on digital image data on a sheet fed from any of the feeding trays FT1-FT5.

The image-formed sheet is conveyed with not-shown convey section in the image forming section 500 to the sheet ejection section 20, subjected to predetermined finishing processing (for example, stapling, offset, grouping, punching) by the finishing mechanism of the sheet ejection section 20, and then ejected to any of the ejecting trays ET1, ET2.

Here, the image forming processing according to the embodiment is a series of processing by the image forming section 500 from image formation on the sheet to ejection of the image-formed sheet to the sheet ejection section 20.

Figure 2:
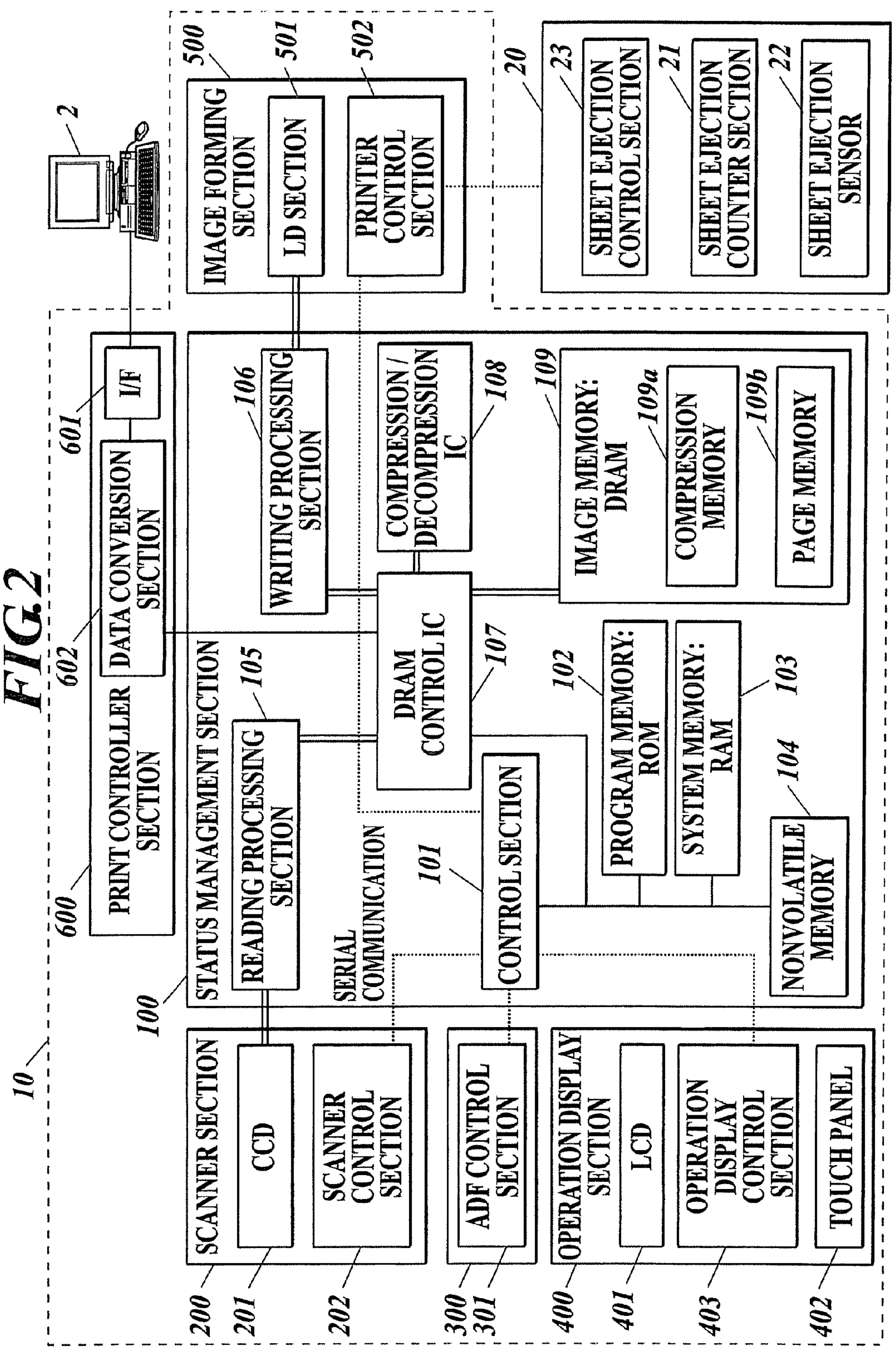
FIG. 2 is a block diagram showing a functional configuration of the image forming system.

The image forming processing is temporarily stopped per the number of units (specified number of sheets/sets/jobs) for stop specified by a user, in the case of setting temporary stop mode, as described later. Moreover, the image forming processing restarts after the temporary stop according to a previously-set restarting method to be described FIG. 2 is a block diagram showing a functional configuration of the image forming system 1.

The body section 10 is configured to include: the status management section 100; the scanner section 200; the ADF section 300; the operation display section 400; the image forming section 500; and a print controller 600.

The status management section 100 is configured to include a control section 101; a program memory (ROM: Read Only Memory) 102; a system memory (RAM: Random Access Memory) 103; a nonvolatile memory 104; a reading processing section 105; a writing processing section 106; a Dynamic Random Access Memory (DRAM) control IC 107; a compression/decompression IC 108: and an image memory 109.

The control section 101 is composed of a Central Processing Unit (CPU) and the like, for example, and reads various programs stored in the ROM 102, such as a system program, image forming processing program, and ejecting processing program to expand the programs in the RAM 103 so as to collectively control each section of the image forming system 1 according to the expanded programs.

For example, the control section 101 stores setting information for each job input via the operation display section 400 in a predetermined region of the RAM 103 to execute the job based on the stored setting information.

Here, the job means a series of operations related to image formation such as copying. For example, in the case of copying a document of a plurality of sheets, one job is a series of operations related to a copy of the document of a plurality of sheets. In the case of copying a plurality of sets, one job is a series of operations related to a copy of the plurality of sets.

The ROM 102 is composed of a nonvolatile memory such as semiconductor, and stores various programs such as a system program corresponding to the image forming system 1, image forming processing program executable on the system program, ejecting processing program, and so on. Each of the programs is stored in a form of computer-readable program code, and the control section 101 successively executes the operations according to the program code.

The RAM 103 forms a work area for temporarily storing various programs to be executed by the control section 101 and data associated with there programs, and stores a job queue, various operation settings, printing data of each job, and so on. Here, the printing data includes a printing condition set to be common to a plurality of pages, a printing condition set for each page, and the image data.

The nonvolatile memory 104 stores various setting data regarding the image forming system, and so on.

The reading processing section 105 performs various processing such as analog signal processing, A/D converting processing, and shading processing to the analog image signal input from the scanner section 200, and creates digital image data to output it to the DRAM control IC 107.

The writing processing section 106 creates a Pulse Width Modulation (PWM) signal based on the image data input from the compression/decompression IC 108 to output the created signal to the image forming section 500.

The DRAM control IC 107 controls compressing/decompressing processing by the compression/decompression IC 108 based on a control by the control section 101, and controls an input/output of the image data to/from the image memory 109.

Specifically, the DRAM control IC 107 allows the compression/decompression IC 108 to compress the digital data input from the reading processing section 105 or the image data input from the print controller section 600, and writes the compressed image data into a compression memory 109*a* of the image memory 109 so that the compressed image data is temporarily stored therein. Moreover, the DRAM control IC 107 allows the compression/decompression IC 108 to decompress the image data stored in the image memory 109 to output the decompressed image data to the writing processing section 106. On this occasion, when a control signal for executing an image synthesis processing is output from the control section 101, the DRAM control IC 107 allows the compression/decompression IC 108 to decompress the image data, and then superimposes a specific image data in the nonvolatile memory 104 thereon to output it to the writing processing section 106.

Moreover, the DRAM control IC 107 outputs control data input from the print controller 600 to the control section 101.

The compression/decompression IC 108 performs compressing processing and decompressing processing of the image data by control of the DRAM control IC 107.

The image memory 109 includes the compression memory 109*a* composed of DRAM and the page memory, for example. The compression memory 109*a* temporarily stores a job file which has been compressed in the compression/decompression IC 108 according to a control signal input from the DRAM control IC 107, for example. The page memory 109*b* temporarily stores the non-compressed job file to be printed/outputted before print-outputting, for example.

The scanner section 200 is configured to include an image sensor such as a CCD 201 and a scanner control section 202. The scanner control section 202 drives/controls each section of the scanner section 200 based on a control signal from the control section 101. Specifically, the scanner control section 202 allows scan exposure on a document surface placed on the contact glass to be performed to form an image of reflected light on CCD to read the image. After that, a light signal of the formed image is photoelectric-converted to create the analog image signal to be output to the reading processing section 105.

The ADF section 300 includes an ADF control section 301 to control the ADF section 300 based on a control signal from the control section 101, and automatically feeds/sends each sheet of the document placed on a document tray (not-shown) onto the contact glass of the scanner section 200.

The operation display section 400 is configured to include: a Liquid Crystal Display (LCD) 401; a touch panel 402 provided integrally with the LCD 401; the operation display control section 403; and others such as no-shown operation key group.

The LCD 401 displays statuses of various setting screens and the images, and an operation status of each function on a screen. Moreover, on the screen of the LCD 401, the touch panel 402 which is pressure sense type (film resistance pressure type) and in which transparent electrodes are arranged in a reticular pattern is configured, and an X-Y coordinate of a point operated with a finger, touch pen or the like is detected by a voltage value so that the detected positional signal is output as an operation signal to the operation display control section 403.

Specifically, the touch panel 402 is operated when a user sets/releases the temporary stop mode.

The touch panel 402 is also operated as a specify section when a user specifies the number (number of sheets/sets/jobs) of units for stop in the temporary stop mode.

The touch panel 402 is also operated as a first setting section (setting section) when a user sets an automatic start time as a predetermined time between detection of removing the sheet from the ejecting tray ET and restart of the image forming processing after the temporary stop of the image forming processing in the temporary stop mode.

Moreover, the touch panel 402 is operated as an instruction section when a user instructs the restart of the image forming processing after the temporary stop of the image forming processing in the temporary stop mode.

Furthermore, the touch panel 402 is operated as a second setting section (setting section) when a, user sets as the restarting method of the image forming processing any of an automatic restart mode by a first control where the image forming processing restarts when a previously set automatic start time has passed since the detection of removing the sheet from the ejecting tray ET, and a manual start mode by a second control where the image forming processing restarts when it is detected that the sheet has been removed from the ejecting tray ET and the restart of the image forming processing is instructed.

The operation display control section 403 performs display control on the LCD 401 based on a control signal from the control section 101. For example, the operation display control section 403 allows the LCD 401 to display a basic screen for inputting a print condition, setting/releasing of the temporary stop mode, specifying of the number of units for stop, the setting screens for setting the restarting method, various processing results, and so on. In addition, the operation display control section 403 outputs the operation signal input from the operation key group or the touch panel on the LCD 401 to the control section 101.

Here, setting/releasing of the temporary stop mode, specifying of the number of units for stop, and setting the restarting method which are performed on the LCD 401 and the touch panel 402 will be described with reference to FIGS. 3-5.

Figure 3:
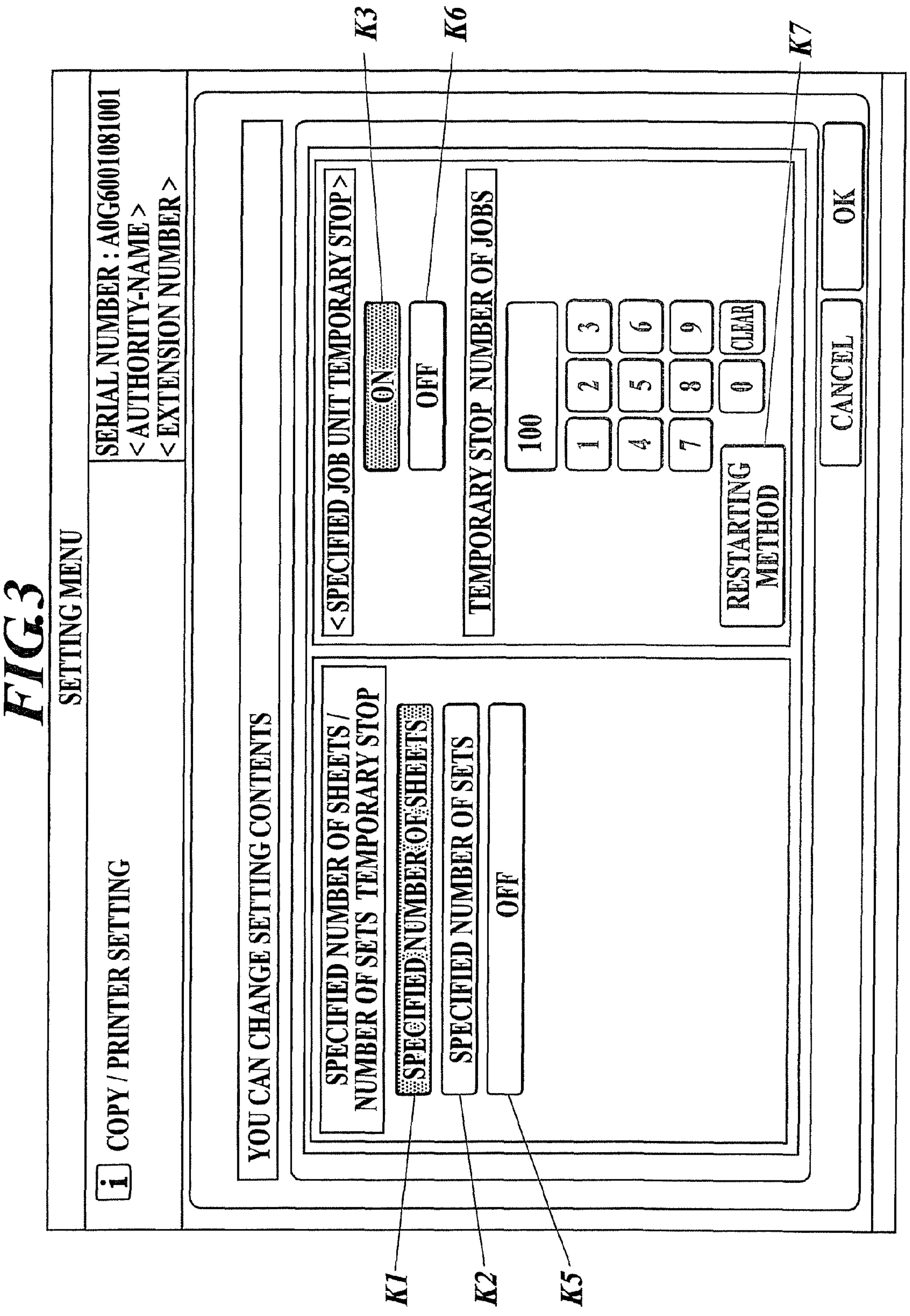
FIG. 3 is an example of a setting screen for setting/releasing a temporary stop mode displayed on an LCD and for specifying the number of jobs as the number of units for stop.

A user performs setting/releasing of the temporary stop mode and setting of the number of units for stop by operating each operation button on the touch panel 402 on the setting screen displayed on the LCD 401 shown in FIG. 3.

On the setting screen of FIG. 3, buttons K1-K3 for specifying the number of units for stop of the image forming processing in the temporary stop mode are displayed. These buttons K1-K3 are: the button K1 for setting the temporary stop mode where the temporary stop is performed per the specified number of sheets, the button K2 for setting the temporary stop mode where the temporary stop is performed per the specified number of sets, and the button K3 for setting the temporary mode where the temporary stop is performed per the specified number of jobs. By operating any of the buttons K1-K3 to specify any of the number of sheets/sets/jobs as the number of units for stop of the image forming processing, the temporary stop mode in which the image forming processing is temporarily stopped per the number of units for stop is set (specifying step).

For example, when setting the temporary stop mode in which the temporary stop is performed per the specified number of sets, a user depresses the button K2 on the setting screen of FIG. 3. Then, the setting screen shown in FIG. 4 is displayed on the LCD 401, and a numeric keypad on the touch panel 402 on the setting screen is operated to input the number of sets (for example, 100 (one hundred)) intended to be specified as the number of units for stop, and then the OK button K4 displayed on the lower side of the screen is depressed. By the operation, the temporary stop mode in which the temporary stop is performed per 100 sets is set.

Moreover, for example, when setting the temporary stop mode in which the temporary stop is performed per the specified number of jobs, a user operates the numeric keypad on the touch panel 402 on the setting screen of FIG. 3 to input the number of jobs (for example, 100 (one hundred)) intended to be specified as the number of units for stop, and then depresses the button K3. By the operation, the temporary stop mode in which the temporary stop is performed per 100 jobs is set.

On the setting screen of FIG. 3, a button K5 for releasing the temporary stop mode in which the temporary stop is performed per the specified number of sheets or the temporary stop mode in which the temporary stop is performed per the specified number of sets, and a button K6 for releasing the temporary stop mode in which the temporary stop is performed per the specified number of jobs are displayed. By operating the buttons K5, K6 on the touch panel 402, the temporary stop mode is released.

On the lower side of the setting screen of FIG. 3, a button K7 for setting the restarting method is displayed. When a user depresses the button K7 displayed on the setting screen of FIG. 3 on the touch panel 402, the setting screen shown in FIG. 5 is displayed on the LCD 401.

Figure 5:
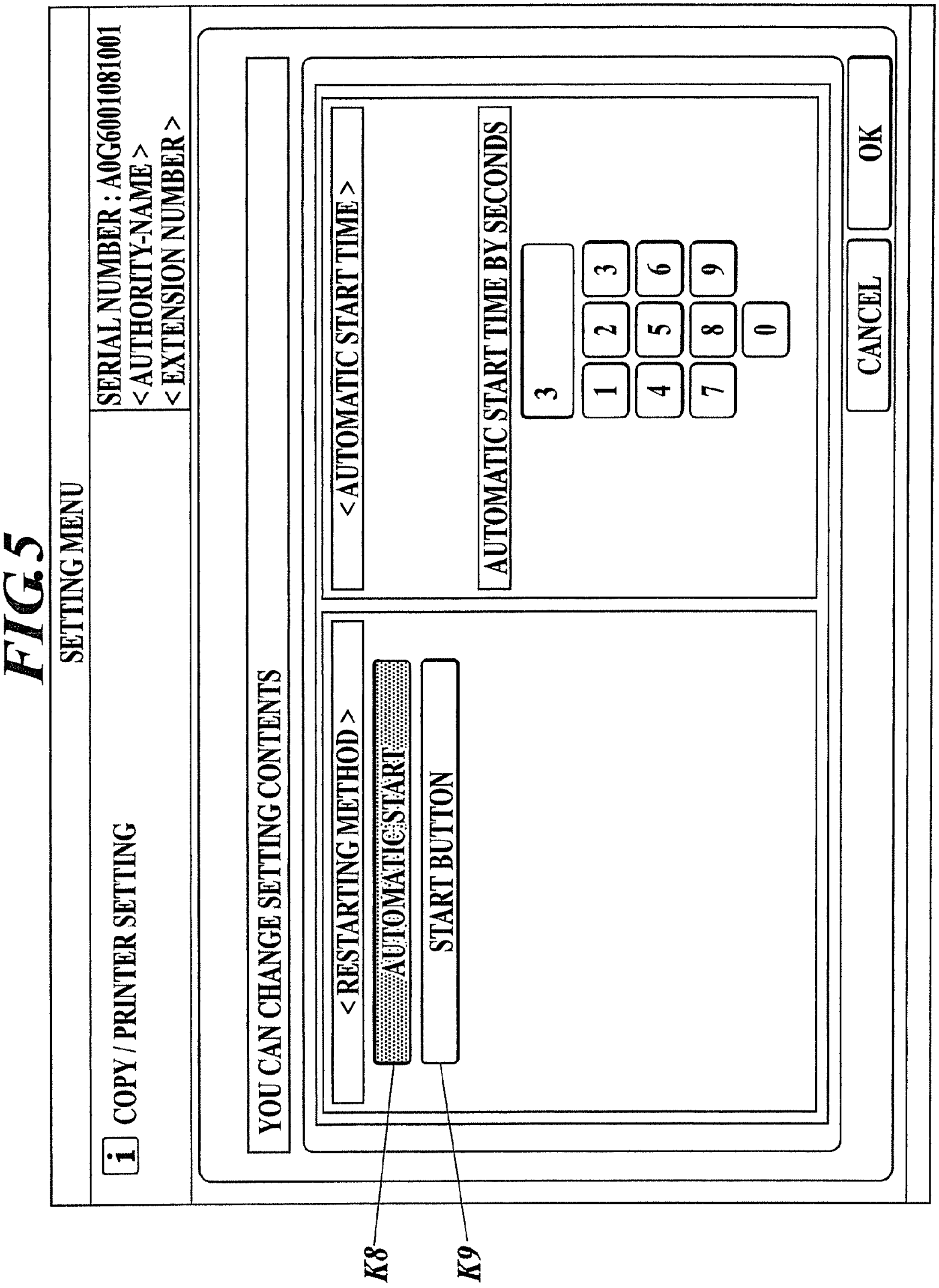
FIG. 5 is an example of a setting screen for specifying a restarting method displayed on the LCD.

On the setting screen of FIG. 5, as the restarting method, a button K8 for setting the automatic restart mode to perform automatic start, and a button K9 for setting the manual restart mode to start according to operation of the start button are displayed. When a user operates the buttons K7, K8 on the touch panel 402, the automatic restart mode or the manual restart mode are set (secondly setting step). When setting the automatic restart mode, a user sets, by operating the numeric keypad on the right side of the screen, also automatic start time (for example, 3 (three) seconds) between when the ejecting tray ET becomes empty and when the image forming processing is restarted (firstly setting step, setting step).

Here, the automatic restart mode is a mode in which it is detected that the sheet has been removed from the ejecting tray ET so that the ejecting tray ET has become empty when the image forming processing temporarily stops in the temporary stop mode, and the image forming processing automatically restarts when the set automatic start time has been passed since the detection of removing the sheet from the ejecting tray ET.

The manual restart mode is a mode in which it is detected that the sheet has been removed from the ejecting tray ET so that the ejecting tray ET has become empty when the image processing temporarily stops in the temporary stop mode and the image forming processing restarts when a user depresses the start button.

Figure 4:
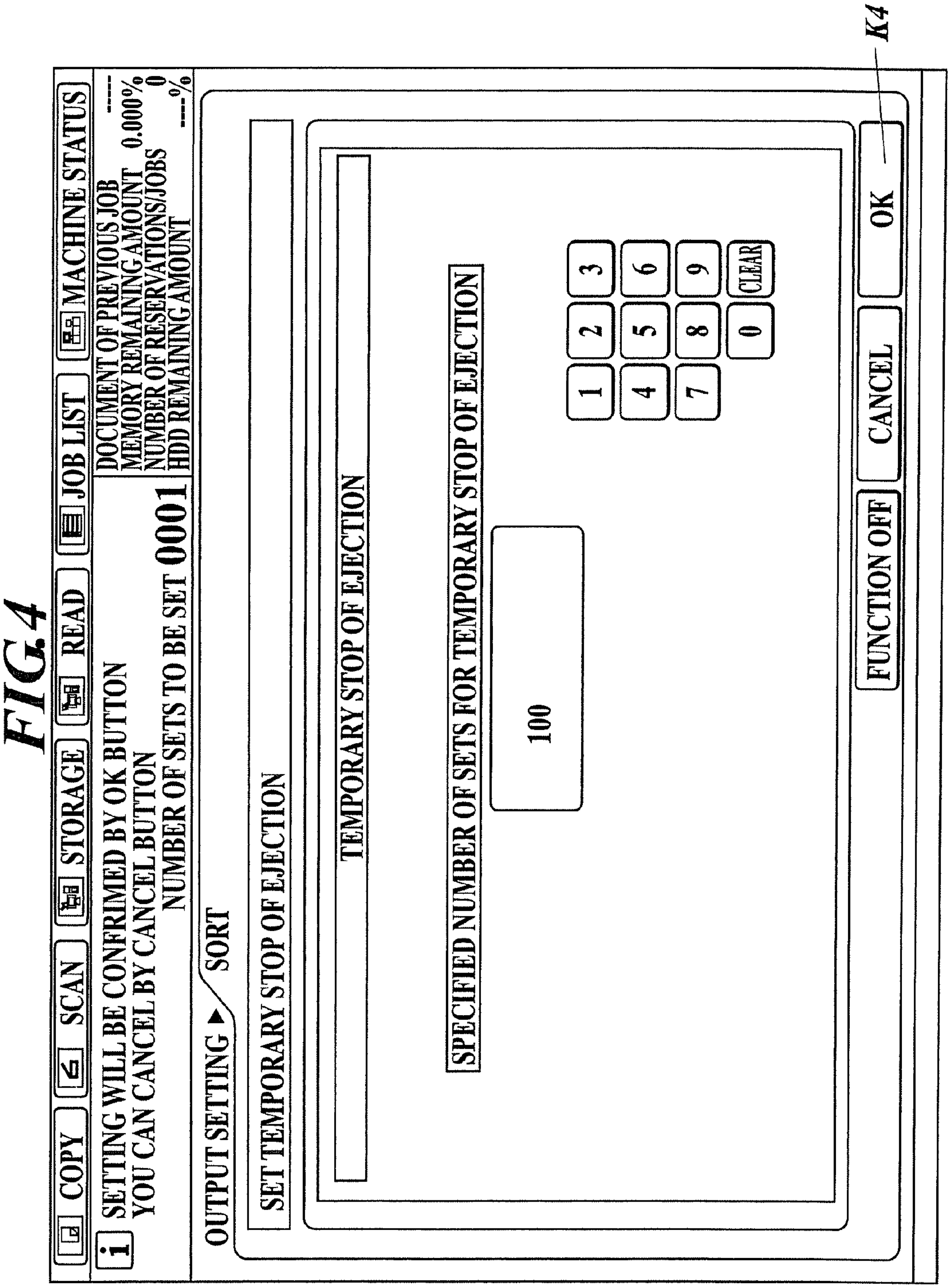
FIG. 4 is an example of a setting screen for specifying the number of sets as the number of units for stop displayed on the LCD.

The status of setting/releasing of the temporary stop mode, the number (number of sheets/sets/jobs) of units for stop, and the restarting method (automatic restart mode/manual restart mode) which are set on the setting screen of FIGS. 3-5 are output to the control section 101 though the operation display section 403, and stored in the nonvolatile memory 104 as the setting information.

The image forming section 500 is configured to include a Laser Diode (LD) section 501 and a printer control section 502, and forms the image on the sheet based on the image data input from the writing processing section 106.

The LD section 501 is equipped with not-shown LD, a photoconductor drum, charging section, exposing section, developing section, transferring section, cleaning section, fixing section, conveying section, and so on. The conveying section is equipped with various rollers such as a feeding roller to convey the sheet along a conveying path in the LD section 501, resist roller and ejecting roller, a conveying path switching plate, an inverting section, and so on. The conveying section of the LD section 501 feeds the sheet specified in the job from any of the feeding trays FT1-FT5 based on the control by the printer control section 502 to convey the fed sheet along the conveying path.

On the conveying path of the LD section 501, a plurality of not-shown sensors is provided. These sensors create a detected signal when the sheet passes to output the detected signal to the printer control section 502.

The printer control section 502 receives a control signal from the control section 101 to control an operation of each section of the LD section 501. The printer control section 502 also counts the number of fed sheets based on the detected signal from the sensors provided on the conveying path to output it to the control section 101. Moreover, the printer control section 502 relays data communication between the control section 101 and a sheet ejection control section 23.

In the image forming section 500, based on the instruction from the printer control section 502, the photoconductor drum surface of the LD section 501 is charged by the charging section, and the LD irradiates the photoconductor drum surface with laser light based on a PWM signal input from the writing processing section 106 to form an electrostatic latent image. The developing section then allows toner to adhere to a region including the electrostatic latent image on the photoconductor drum surface, and the transfer section transfers the toner to the sheet to form the image. After that, the transferred image is fixed with the fixing section, and the image-formed sheet is conveyed to the finishing processing section with the ejecting roller.

The print controller section 600 is equipped with an I/F 601, a data conversion section 602, and so on. The I/F 601 is a communication interface for connecting to a communication network, such as Network Interface Card (NIC) and a modem, and transmits/receives data to/from an external apparatus 2 such as a personal computer (hereinafter referred to as PC for short) through a communication network such as LAN. The data conversion section 602 converts the image data input from the external apparatus 2 through the I/F 601 into the image data of a data format printable in the image forming system 1 with a predetermined page description language to output the image data with the control data to the DRAM control IC 107.

The sheet ejection section 20 includes: a plurality of ejecting trays (first ejecting tray ET1, second ejecting tray ET2) to which the conveyed sheet is ejected; a sheet ejection counter section 21 to detect whether or not the sheet has passed to detect the number of sheets ejected onto each of the ejecting trays ET; a sheet ejection sensor 22 as a detection section to detect existence or nonexistence of the sheet on each of the ejecting trays ET; and a sheet ejection control section 23 to control each section of the sheet ejection section 20 based on the control signal input from the control section 101 through the printer control section 502.

The sheet ejection counter section 21 is provided near a sheet ejecting port to each of the ejecting trays ET, and counts the sheet whenever the sheet is ejected to the ejecting trays ET to output the count value to the control section 101.

The sheet ejection sensor 22 is provided near each of the ejecting trays ET, and detects existence or nonexistence of the sheet on the ejecting trays ET to output the detected signal representing existence or nonexistence of the sheet to the control section 101.

The sheet ejection control section 23 is composed of a not-shown CPU, a system program corresponding to the sheet ejection section 20, a program memory (ROM) to store various processing programs executable on the system program, and a system memory (RAM).

The CPU of the sheet ejection control section 23 drives/controls each section thereof in cooperation with the program stored in the ROM based on the input control signal to allow the sheets ejected from the image forming section 500 to be ejected to the ejecting trays ET.

Two post inserters including an upper stage PI1 and a lower stage PI2 are provided above the sheet ejection section 20, and capable of mounting various kinds of sheets depending on user's needs in each case to feed the sheets.

The sheet ejection section 20 also includes a not-shown finishing mechanism to perform various finishing processing to the sheet conveyed from the body section 10. The finishing mechanism includes, for example, a staple unit to execute stapling processing to the sheet conveyed from the body section 10, an offset unit to execute offsetting processing, a sort unit to execute sorting processing, a group unit to execute grouping processing, a punch unit to execute punching processing, and so on, and performs these finishing processing according to the set sheet ejection mode (for example, stapling, offsetting, sorting, grouping, punching and the like).

As described above, the image forming system 1 according to the embodiment includes the image forming section 500 to perform the image forming processing to form the image on the sheet to eject the image-formed sheet to the sheet ejection section 20. The image forming system 1 also includes the control section 101 to allow the image forming section 500 to stop the image processing pel the specified number of the units (number of sheets/sets/jobs) in the temporary stop mode, and then restart the image forming processing according to the previously set restarting method (automatic restart mode/manual restart mode).

In the temporary stop mode in which the temporary stop is performed per the number of sheets or sets, by repeating the temporary stop and restart of the image forming processing per the specified sheets or sets once or for a plurality of times, one job processing in the temporary stop mode ends.

On the other hand, in the temporary stop mode in which the temporary stop is performed per the specified number of jobs of the successive jobs, when any one of end conditions as predetermined conditions has been met, a series of processing in the temporary stop mode ends. In other words, in the temporary stop mode in which the temporary stop is performed per the number of jobs, when any of the end conditions as predetermined conditions has been met while repeating the temporary stop and restart of the image forming processing per the specified number of jobs once or for a plurality of times, even if the number of jobs has not reached the specified number of jobs for stop, the image forming processing is stopped at the end of current job, the number of jobs counted by the sheet ejection counter 21 until the image forming processing is stopped is reset, and a series of processing end.

Here, the end conditions are following five conditions, for example.

(a) A different number of jobs is specified as the number of units for stop on the touch panel.
(b) Release of the temporary stop mode has been instructed.
(c) A next job is a job for different sheet size.
(d) A next job is a job for different sheet ejection mode.
(e) A next job is a job for different sheet ejection destination.

The end condition (a) that "a different number of jobs is specified as the number of units for stop on the touch panel" is the case that when the number of jobs as the number of units for stop in the temporary stop mode is "10 (ten) jobs", "30 (thirty) jobs" has been newly specified as the number of units for stop on the touch panel 402 on the setting screen of FIG. 3 on the LCD 401 to change the number of units for stop, for example.

The end condition (b) that "release of the temporary stop mode has been instructed" is the case that the button K6 for releasing the temporary stop mode in which the temporary stop is performed per the specified number of jobs has been operated on the touch panel 402 on the setting screen of FIG. 3 on the LCD 401 to release the temporary stop mode, for example.

The end condition (c) that "a next job is a job for different sheet size" is the case that a job for sheet size "B5" has been specified as the next job while the sheet size of current job is "A4", for example.

The end condition (d) that "a next job is a job for different sheet ejection mode" is the case that a job to be performed in the sheet ejection mode including stapling has been specified as the next job while current job is performed in the sheet ejection mode without stapling, for example.

The end condition (e) that "a next job is a job for different sheet ejection destination" is the case that a job whose ejection destination is the second ejecting tray ET2 has been specified as the next job while the ejection destination of the current job is the first ejecting tray ET1, for example.

Here, the temporary stop mode in which the temporary stop is performed per the specified number of jobs is applied to processing for a job group composed of a number of jobs like variable printing which performs printing while replacing a part of each of job contents. More specifically, the above temporary stop mode is applied to the case of making a number of direct mails which are same except addresses.

As this example, in the temporary stop mode in which the temporary stop is performed per the specified number of jobs, in the case of printing a number of direct mails which are same except addresses, when another job is instructed to be printed subsequent to printing of the job groups, the job group can not be distinguished from the other job to be printed after the job group on the equipment side. For this reason, even in the case that another job appears after the job group, it has been impossible to stop the image forming processing or to reset the count of the number of jobs by recognizing the job subsequent to the job group as a different job from the job group.

Therefore, the present invention is configured to judge whether or not any of the five end conditions (a)-(e) has been met, and when any of the end conditions (a)-(e) has been met, temporarily stops the image forming processing and resets the number of jobs counted until the image forming processing is stopped. According to the operation, even in the case of the temporary stop mode in which the temporary stop is performed per the specified number of jobs, it becomes possible to recognize the end of the job group subjected to the temporary stop mode to temporarily stop the image forming processing at a proper timing.

Figure 6:
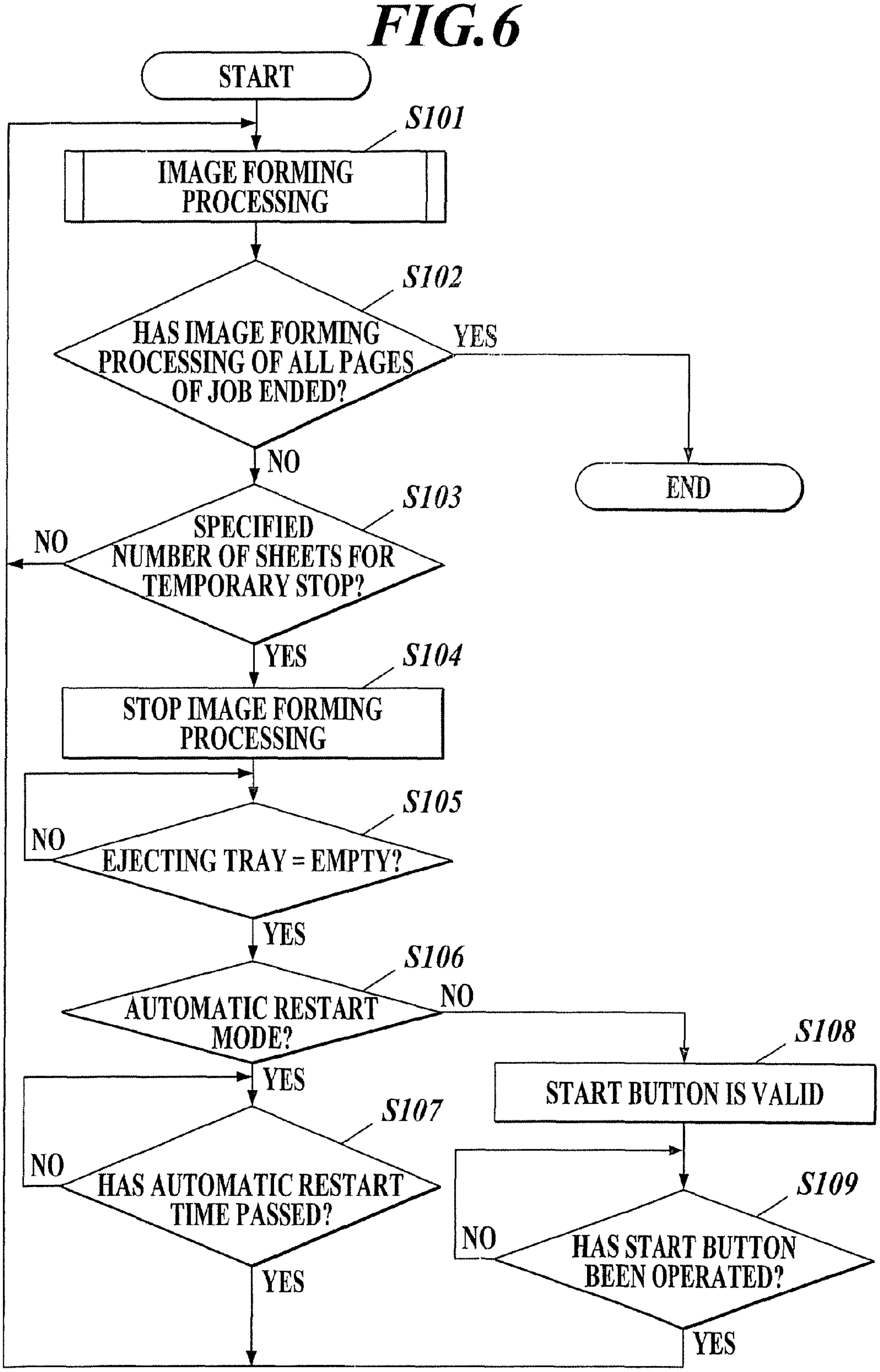
FIG. 6 is a flowchart showing processing in the temporary stop mode in which the image forming processing is temporarily stopped per specified number of sheets.

Next, an operation flow in the case of setting the temporary stop mode in which the temporary stop is performed per the number of sheets will be described with reference to FIG. 6.

In Step S101, the image forming section 500 performs the image forming processing to form the image on the sheet to eject the image-formed sheet to the sheet ejection section 20 (image forming step). When the image-formed sheet is ejected onto the ejecting tray ET of the sheet ejection section 20 by the image forming processing, the sheet ejection counter section 21 adds 1 (one) to the count value.

In Step S102, the control section 101 judges whether or not the image forming processing of all page of the job has ended. When the control section 101 judges that the image forming processing of all page of the job has ended in Step S102 (Step S102; Yes), the control section 101 ends this processing.

On the other hand, when the control section 101 judges that the image forming processing of all page of the job has not been ended in Step S102 (Step S102; No), the control section 101 judges whether or not the number of image-formed sheets has reached the number of sheets specified as the number of units for performing the temporary stop with reference to the count value in the sheet ejection counter section 21 in subsequent Step S103. When the control section 101 judges that the number of image-formed sheets has not reached the specified number of sheets for the temporary stop (Step S103; No), the processing returns to Step S101 and the above steps are repeated.

On the other hand, when the control section 101 judges that the number of image-formed sheets has reached the specified number of sheets for the temporary stop (Step S103; Yes), in subsequent Step S104, after the sheet ejection to the sheet ejection section 20, the control section 101 allows the image forming section 500 to temporarily stop the image forming processing (controlling step).

In Step S105, the control section 101 judges whether or not the sheet has been removed from the ejecting tray ET so that the ejecting tray ET has become empty based on the detected signal from the sheet ejection sensor 22 (detecting step). When the control section 101 judges that the ejecting tray ET has become empty in Step S105 (Step S105; Yes), the control section 101 clears the count value until the stop time counted by the sheet ejection counter section 21, and proceeds to Step S106.

In Step S106, the control section 101 judges whether or not the automatic restart mode is set as the restarting method of the image forming processing based on the setting information stored in the nonvolatile memory 104. When the control section 101 judges that the automatic restart mode is set in Step S106 (Step S106; Yes), the control section 101 judges whether or not the automatic start time has passes since the ejecting tray ET has become empty in subsequent Step S107. When the control section 101 judges that the automatic start time has passes since the ejecting tray ET has become empty in Step S107 (Step S107; Yes), the control section 101 returns to Step S101 and allows the image forming section 500 to restart the image forming processing (controlling step).

On the other hand, when the control section 101 judges that the automatic restart mode is not set in Step S106 (Step S106; No), the control section 101 recognizes that the manual restart mode is set, and activates a start button in subsequent Step S108 to judges whether or not the start button has been operated in Step S109 (instructing step). When the control section 101 judges that the start button has been operated in Step S109 (Step S109; Yes), the control section 101 returns to Step S101 and restarts the image forming processing (controlling step).

Figure 7:
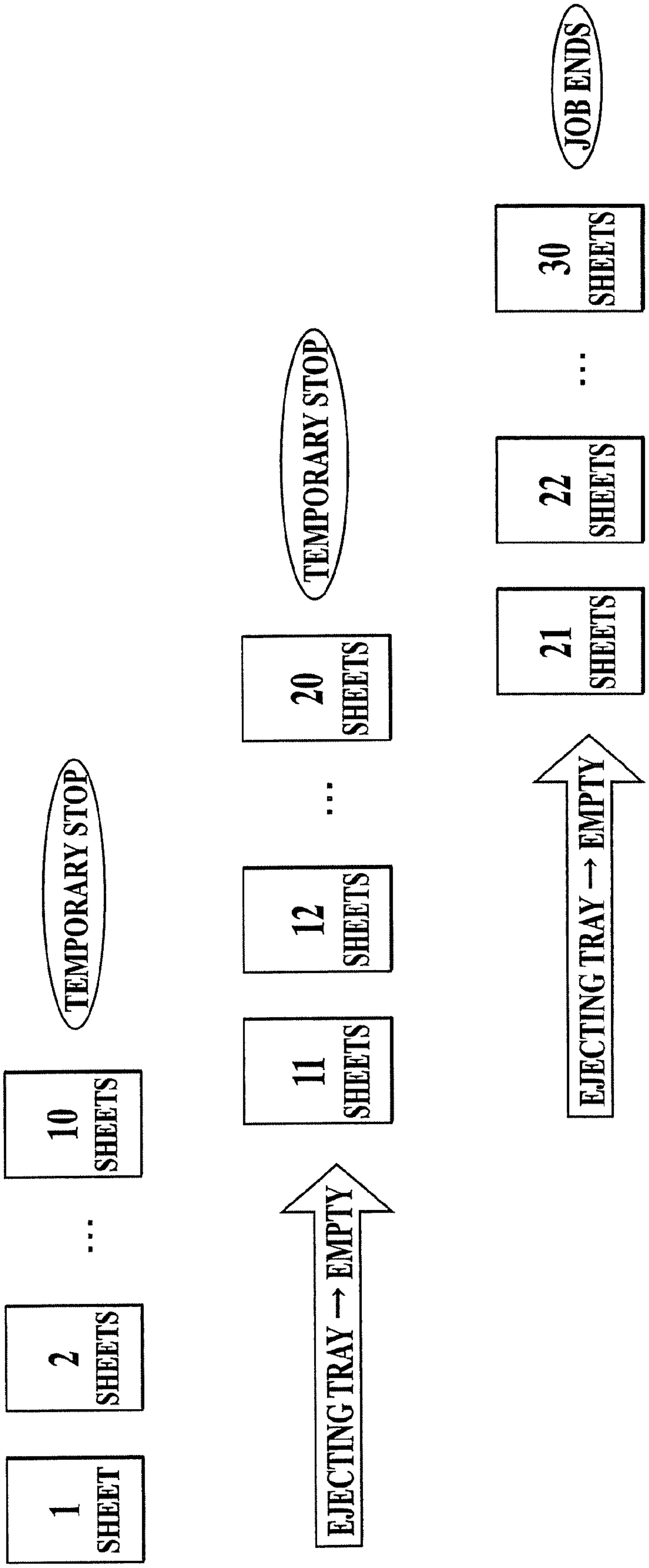
FIG. 7 is an explanation diagram for explaining an example of processing in the temporary stop mode in which the image forming processing is temporarily stopped per specified number of sheets.

FIG. 7 shows an example of processing to temporarily stop the image forming processing per the specified number of sheets. FIG. 7 shows the case that whole number of sheets of the job is 30 (thirty) and the number of sheets specified as the number of units for stop is 10 (ten).

As shown in FIG. 7, the image forming section 500 performs the image forming processing in sequence from the first sheet. When the image forming processing of the tenth sheet has been completed and the number of image-formed sheets ejected to the ejecting tray ET reaches 10 (ten), the control section 101 allows the image forming section 500 to temporarily stop the image forming processing. After that, a user removes the sheet bundle accumulated on the ejecting tray ET so that the ejecting tray ET becomes empty.

When it is detected that the ejecting tray ET becomes empty based on the detected signal from the sheet ejection sensor 22, the image forming section 500 subsequently performs the image forming processing in sequence from the eleventh sheet. When the image forming processing of the twentieth sheet has been completed and the number of image-formed sheets ejected to the ejecting tray ET reaches 10 (ten) again, the control section 101 allows the image forming section 500 to temporarily stop the image forming processing. After that, a user removes the sheet bundle accumulated on the ejecting tray ET so that the ejecting tray ET becomes empty.

When it is detected that the ejecting tray ET becomes empty based on the detected signal from the sheet ejection sensor 22, the image forming section 500 subsequently performs the image forming processing in sequence from the twenty-first sheet. When the image forming processing of the thirtieth sheet has been completed and the number of image-formed sheets ejected to the ejecting tray ET reaches 10 (ten) again, the control section 101 allows the image forming section 500 to temporarily stop the image forming processing.

Thus, the image forming processing of the job ends.

Figure 8:
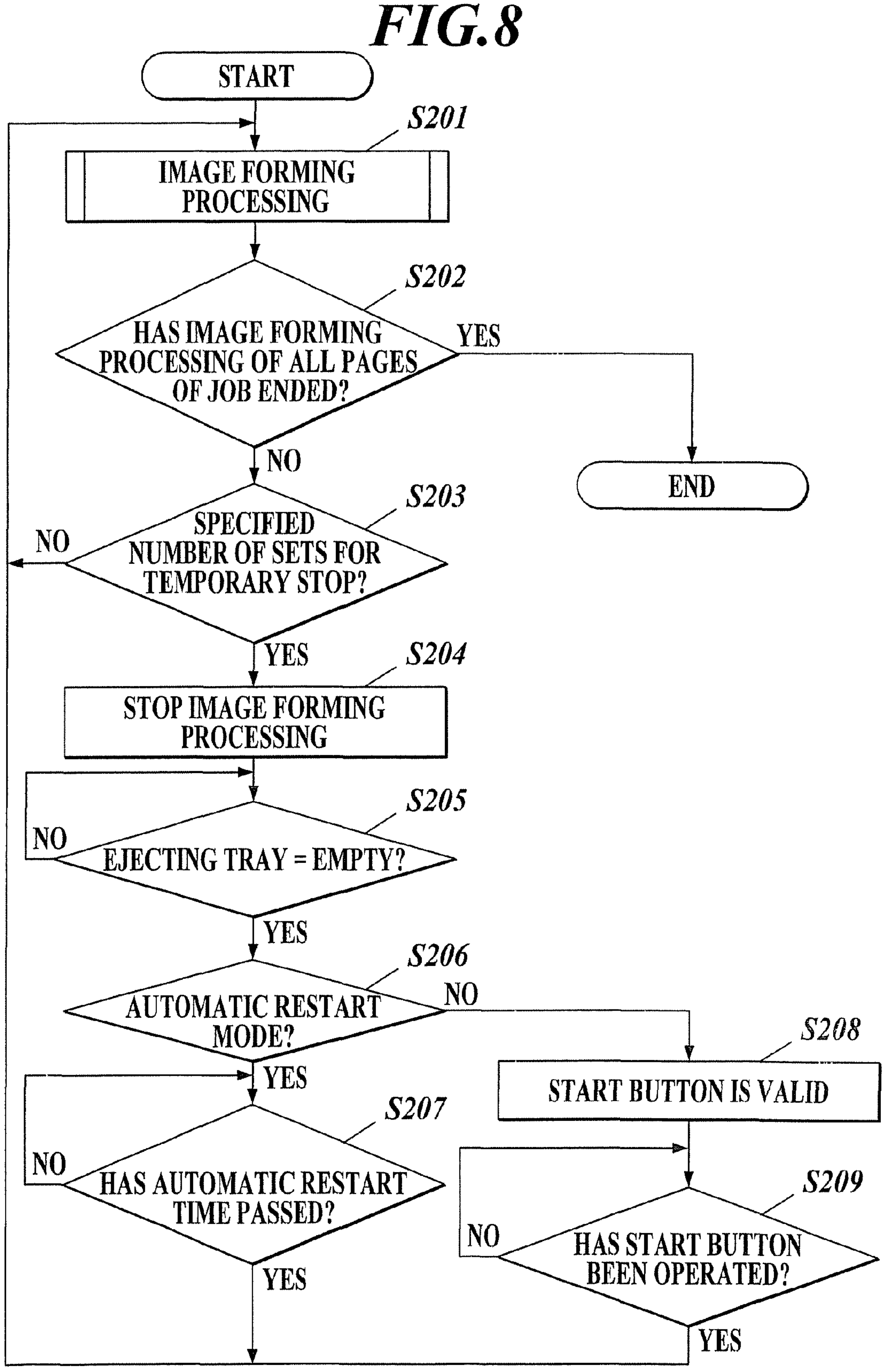
FIG. 8 is a flowchart showing processing in the temporary stop mode in which the image forming processing is temporarily stopped per specified number of sets.

Next, an operation flow in the case of setting the temporary stop mode in which the temporary stop is performed per the number of sets will be described with reference to FIG. 8.

In Step S201, the image forming section 500 performs the image forming processing to form the image on the sheet to eject the image-formed sheet to the sheet ejection section 20 (image forming step). When the image-formed sheet is ejected onto the ejecting tray ET of the sheet ejection section 20 by the image forming processing, the sheet ejection counter section 21 adds 1 (one) to the count value.

In Step S202, the control section 101 judges whether or not the image forming processing of all page of the job has ended. When the control section 101 judges that the image forming processing of all page of the job has ended in Step S202 (Step S202; Yes), the control section 101 ends this processing.

On the other hand, when the control section 101 judges that the image forming processing of all page of the job has not ended in Step S202 (Step S202; No), the control section 101 judges whether or not the number of image-formed sets has reached the number of sets specified as the number of units for performing the temporary stop with reference to the count value in the sheet ejection counter section 21 in subsequent Step S203. When the control section 101 judges that the number of image-formed sets has not reached the specified number of sets for the temporary stop in Step S203 (Step S203; No), the processing returns to Step S201 and the above steps are repeated.

On the other hand, when the control section 101 judges that the number of image-formed sets has reached the specified number of sets for the temporary stop in Step S203 (Step S203; Yes), in subsequent Step S204, after the sheet ejection to the sheet ejection section 20, the control section 101 allows the image forming section 500 to temporarily stop the image forming processing (controlling step).

In Step S205, the control section 101 judges whether or not the sheet has been removed from the ejecting tray ET so that the ejecting tray ET has become empty based on the detected signal from the sheet ejection sensor 22 (detecting step). When the control section 101 judges that the ejecting tray ET has become empty in Step S205 (Step S205; Yes), the control section 101 clears the count value until the stop time counted by the sheet ejection counter section 21, and proceeds to Step S206.

In Step S206, the control section 101 judges whether or not the automatic restart mode is set as the restarting method of the image forming processing based on the setting information stored in the nonvolatile memory 104. When the control section 101 judges that the automatic restart mode is set in Step S206 (Step S206; Yes), the control section 101 judges whether or not the automatic start time has passes since the ejecting tray ET has become empty in subsequent Step S207. When the control section 101 judges that the automatic start time has passes since the ejecting tray ET has become empty in Step S207 (Step S207; Yes), the control section 101 returns to Step S201 and allows the image forming section 500 to restart the image forming processing (controlling step).

On the other hand, when the control section 101 judges that the automatic restart mode is not set in Step S206 (Step S206; No), the control section 101 recognizes that the manual restart mode is set, and activates a start button in subsequent Step S208 to judges whether or not the start button has been operated in Step S109 (instructing step). When the control section 101 judges that the start button has been operated in Step S209 (Step S209; Yes), the control section 101 returns to Step S201 and restarts the image forming processing (controlling step).

Figure 9:
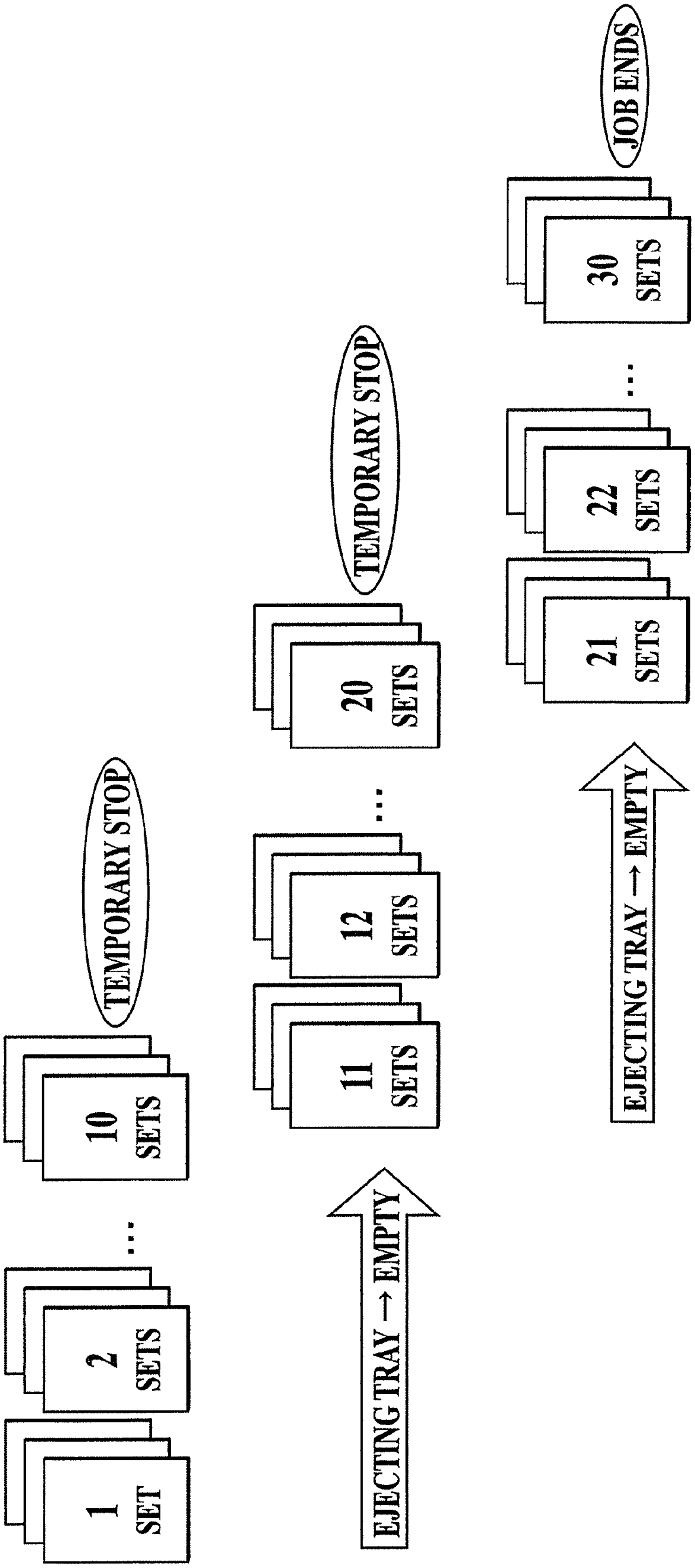
FIG. 9 is an explanation diagram for explaining an example of processing in the temporary stop mode in which the image forming processing is temporarily stopped per specified number of sets.

FIG. 9 shows an example of processing to temporarily stop the image forming processing per the specified number of sets. FIG. 9 shows the case that whole number of sheets of the job is 30 (thirty) and the number of sheets specified as the number of units for stop is 10 (ten).

As shown in FIG. 9, the image forming section 500 performs the image forming processing in sequence from the first set. When the image forming processing of last page of the tenth set has been completed and the number of image-formed sets ejected to the ejecting tray ET reaches 10 (ten), the control section 101 allows the image forming section 500 to temporarily stop the image forming processing. After that, a user removes the sheet bundle accumulated on the ejecting tray ET so that the ejecting tray ET becomes empty.

When it is detected that the ejecting tray ET becomes empty based on the detected signal from the sheet ejection sensor 22, the image forming section 500 subsequently performs the image forming processing in sequence from the eleventh set. When the image forming processing of last page of the twentieth set has been completed and the number of image-formed sets ejected to the ejecting tray ET reaches 10 (ten) again, the control section 101 allows the image forming section 500 to temporarily stop the image forming processing. After that, a user removes the sheet bundle accumulated on the ejecting tray ET so that the ejecting tray ET becomes empty.

When it is detected that the ejecting tray ET becomes empty based on the detected signal from the sheet ejection sensor 22, the image forming section 500 subsequently performs the image forming processing in sequence from the twenty-first set. When the image forming processing of last page of the thirtieth set has been completed and the number of image-formed sets ejected to the ejecting tray ET reaches 10 (ten) again, the control section 101 allows the image forming section 500 to temporarily stop the image forming processing.

Thus, the image forming processing of the job ends.

Figure 10:
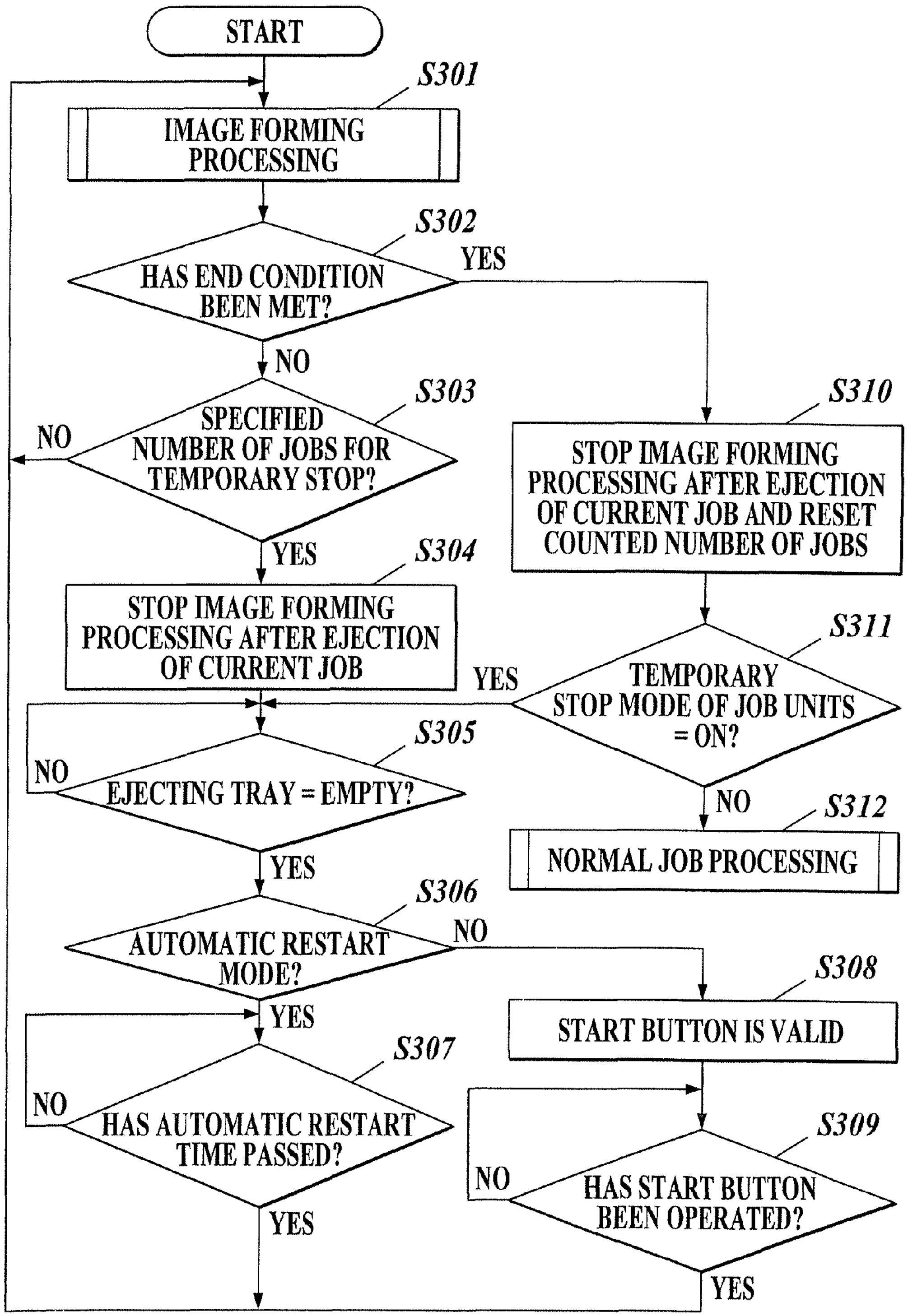
FIG. 10 is a flowchart showing processing in the temporary stop mode in which the image forming processing is temporarily stopped per specified number of jobs.

Next, an operation flow in the case of setting the temporary stop mode in which the temporary stop is performed per the number of jobs will be described with reference to FIG. 10.

In Step S301, the image forming section 500 performs the image forming processing to form the image on the sheet (image forming step). When the image-formed sheet is ejected onto the ejecting tray ET of the sheet ejection section 20 by the image forming processing, the sheet ejection counter section 21 adds 1 (one) to the count value.

In Step S302, the control section 101 judges whether or not any of the end conditions (a) "a different number of jobs is specified as the number of units for stop on the touch panel", (b) "release of the temporary stop mode has been instructed", (c) "a next job is a job for different sheet size", (d) "a next job is a job for different sheet ejection mode" and (e) "a next job is a job for different sheet ejection destination" has been met. When the control section 101 judges that none of the end conditions (a)-(e) has been met in Step S302 (Step S302; No), the control section 101 judges whether or not the number of jobs for which the image has been formed has reached the number of jobs specified as the number of units for performing the temporary stop with reference to the count value in the sheet ejection counter section 21 in subsequent Step S303. When the control section 101 judges the number of jobs for which the image has been formed has not reached the specified number of jobs for performing the temporary stop in Step S303 (Step S303; No), the control section 101 returns to Step S301 and repeats the above processing.

On the other hand, when the control section 101 judges that the number of jobs has reached the specified number of jobs for performing the temporary stop in Step S303 (Step S303; Yes), in subsequent Step S304, after the sheet ejection of current job to the sheet ejection section 20, the control section 101 allows the image forming section 500 to temporarily stop the image forming processing (controlling step).

In Step S305, the control section 101 judges whether or not the sheet has been removed from the ejecting tray ET so that the ejecting tray ET has become empty based on the detected signal from the sheet ejection sensor 22 (detecting step). When the control section 101 judges that the ejecting tray ET has become empty in Step S305 (Step S305; Yes), the control section 101 clears the sheet ejection counter section 21 and proceeds to Step S306.

In Step S206, the control section 101 judges whether or not the automatic restart mode is set as the restarting method of the image forming processing based on the setting information stored in the nonvolatile memory 104. When the control section 101 judges that the automatic restart mode is set in Step S306 (Step S306; Yes), the control section 101 judges whether or not the automatic start time has passes since the ejecting tray ET has become empty in subsequent Step S307. When the control section 101 judges that the automatic start time has passes since the ejecting tray ET has become empty in Step S307 (Step S307; Yes), the control section 101 returns to Step S301 and allows the image forming section 500 to restart the image forming processing (controlling step).

On the other hand, when the control section 101 judges that the automatic restart mode is not set in Step S306 (Step S306; No), the control section 101 activates a start button in subsequent Step S308 to judges whether or not the start button has been operated in Step S309 (instructing step). When the control section 101 judges that the start button has been operated in Step S309 (Step S309; Yes), the control section 101 returns to Step S301 and allows the image forming section 500 to restart the image forming processing (controlling step).

On the other hand, when the control section 101 judges that at least any one of the end conditions (a)-(e) has been met in Step S302 (Step S302; Yes), in subsequent Step S310, after ejecting all pages of current job to the sheet ejection section 20, the control section 101 allows the image forming section 500 to stop the image forming processing, and resets the number of jobs counted in the sheet ejecting counter section 21 (controlling step).

In Step S311, the control section 101 judges whether or not the temporary stop mode in which the temporary stop is performed per the specified number of jobs is set. When the control section 101 judges that the temporary stop mode in which the temporary stop is performed per the specified number of jobs is set in Step S311 (Step S311; Yes), the processing exceeds to Step S305. On the other hand, when the control section 101 judges that the temporary stop mode in which the temporary stop is performed per the specified number of jobs is not set in Step S311 (Step S311; No), the processing shifts to normal job processing.

Figure 11:
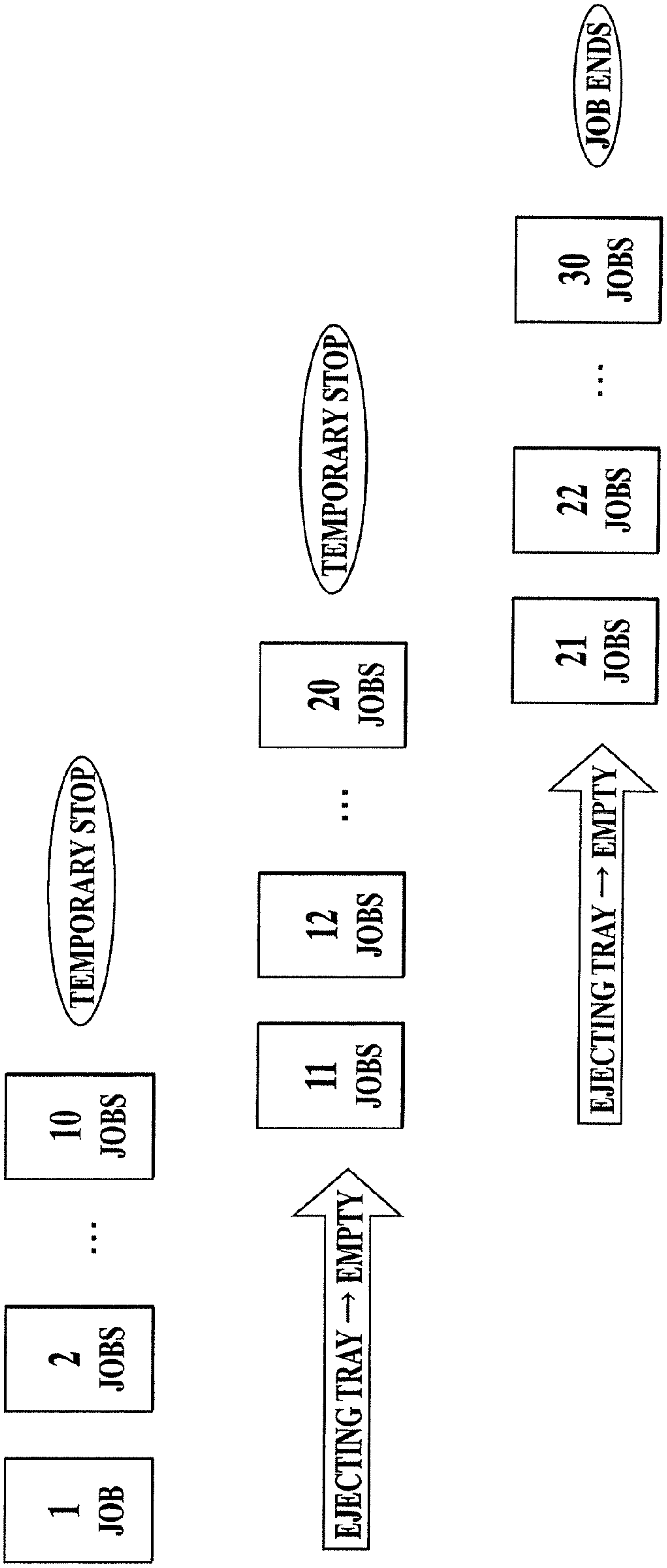
FIG. 11 is an explanation diagram for explaining an example of processing in the temporary stop mode in which the image forming processing is temporarily stopped per specified number of jobs.

FIG. 11 shows an example of processing to temporarily stop the image forming processing per the specified number of jobs. FIG. 9 shows the case that the number of jobs specified as the number of units for stop is 10 (ten).

As shown in FIG. 11, the image forming section 500 performs the image forming processing in sequence from the sheet of first job. When the image forming processing of last page of the tenth job has been completed and the number of jobs of image-formed sheets ejected to the ejecting tray ET reaches 10 (ten), the control section 101 allows the image forming section 500 to temporarily stop the image forming processing. After that, a user removes the sheet bundle accumulated on the ejecting tray ET so that the ejecting tray ET becomes empty.

When it is detected that the ejecting tray ET becomes empty based on the detected signal from the sheet ejection sensor 22, the image forming section 500 subsequently performs the image forming processing in sequence from the sheet of eleventh job. When the image forming processing of last page of the twentieth job has been completed and the number of jobs of image-formed sheets ejected to the ejecting tray ET reaches 10 (ten) again, the control section 101 allows the image forming section 500 to temporarily stop the image forming processing. After that, a user removes the sheet bundle accumulated on the ejecting tray ET so that the ejecting tray ET becomes empty.

When it is detected that the ejecting tray ET becomes empty based on the detected signal from the sheet ejection sensor 22, the image forming section 500 subsequently performs the image forming processing in sequence from the sheet of twenty-first job. When the image forming processing of last page of the thirtieth job has been completed and the number of jobs of image-formed sheets ejected to the ejecting tray ET reaches 10 (ten) again, the control section 101 allows the image forming section 500 to temporarily stop the image forming processing.

Moreover, though not shown in the drawings, when at least any one of the end conditions (a)-(e) has been met while performing the image forming processing of twenty-second job, after ejecting all pages of current job (twenty-second job), the control section 101 allows the image forming section 500 to stop the image forming processing, and resets the count value until the stop time counted by the sheet ejection counter section 21.

When the temporary stop mode has been release, in other words, when the end condition (b) has been met, normal job processing is performed from the next job.

On the other hand, when the temporary stop mode has still been set, in other words, when any of the end conditions (a), (c)-(e) has been met, the control section 101 recognizes the next job (twenty-third job) as first job to perform the image forming processing according to the temporary stop mode by the set restarting method.

According to the above-described image forming system 1 of the embodiment of the present invention, since the image forming processing by the image forming section 500 is stopped when reaching the number of units for stop specified with the touch panel 402, the image forming processing can be temporarily stopped at the time of reaching arbitrary number of units specified by a user so that user's burden can be reduced and working efficiency can be improved. In other words, compared to the case of requiring an operation for temporarily stop the image forming processing, user's burden is reduced, and it becomes possible to stop the processing at accurate timing so that working efficiency is improved. Moreover, the timing to perform the temporary stop is not limited to unit of the number of sheets, and the temporary stop can be performed per arbitrary number of units.

Moreover, since the image forming processing is stopped when reaching the specified number of units for stop, paging disorder due to touch to the sheet during the sheet ejection can be prevented and working efficiency in the case performing the work of finishing step per certain number of units and the like can be improved. It also becomes possible to confirm the image on the ejected sheet at regular intervals.

Furthermore, since at least any one of the number of sheets, sets and jobs can be specified as the number of units for stop, it becomes possible to stop the image forming processing per the number of various units depending on user's needs.

Especially, the number of jobs can be specified as the number of units for stop, it becomes possible to temporarily stop the image forming processing when reaching arbitrary number of jobs even in the case of performing the image forming processing of successive jobs such as variable printing which performs printing while replacing a part of each of job contents, so that usability is improved.

Moreover, when the specified number of units for stop is the number of jobs, the counted number of jobs may be reset in each of the cases that a different number of jobs is specified as the number of units for stop with the touch panel 402 as the specify section, that release of the temporary stop mode has been instructed, that a next job is a job for different sheet size, that a next job is a job for different sheet ejection mode, and that a next job is a job for different sheet ejection destination. Thus, even in the case of the temporary stop mode in which the temporary stop is performed per the specified number of jobs, it becomes possible to temporarily stop the image forming processing at arbitrary timing for a user so that usability is further improved.

Moreover, when the first control is specified with the touch panel 402 as the second setting section, the image forming processing restarts when the predetermined time set with the touch panel 402 as the first setting section (setting section) has passed since the sheet has been removed from the sheet ejection section 20. Thus, the image forming processing can restart without an operation for restarting the image forming processing so that user's burden can be reduced. Furthermore, since the predetermined time between removal of the sheet from the sheet ejection section 20 and restart the image forming processing can be set, usability is improved. Moreover, when the second control is set with the touch panel 402 as the second setting section, the sheet is removed from the sheet ejection section 20, and when the image forming processing is instructed to restart with the touch panel 402 as the instructing section, the image forming processing restarts. Therefore, the image forming processing may restart at arbitrary timing in each case, and usability is improved. The system is very convenient for a user because a user may set which of the first control and the second control the system performs.

In addition, since after restarting the image forming processing, when reaching the specified number of units for stop, the image forming processing is stopped again, it becomes possible to repeat starting and stopping of the image forming processing per the number of units for stop so that usability is improved.

The present U.S. patent application claims a priority under the Paris Convention of Japanese patent application No. 2008-157577 filed on Jun. 17, 2008, which shall be a basis of correction of an incorrect translation.

What is claimed is:

1. An image forming system comprising:

an image forming section to perform an image forming processing to form an image on a sheet to eject the image-formed sheet to an sheet ejection section;

a control section to control the image forming processing by the image forming section;

a specify section to specify the number of units for stop in a temporary stop mode in which the image forming processing by the image forming section is temporarily stopped, wherein the number of units for stop specified with the specify section is at least one of the number of sheets, the number of sets, and the number of jobs, wherein the control section allows the image forming section to stop the image forming processing when the image forming processing by the image forming section reaches the number of units for stop specified with the specify section, wherein the control section judges whether or not a predetermined condition has been met when the number of units for stop specified with the specify section is the number of jobs, and when the control section judges that the predetermined condition has been met, the control section stops the image forming processing by the image forming section after ejecting the sheet of a current job and resets a count of the number of jobs until the stop time, and the predetermined condition is at least one of the following conditions:

(a) a different number of jobs is specified as the number of units for stop with the specify section;

(b) release of the temporary stop mode has been instructed;

(c) a next job is a job for different sheet size;

(d) a next job is a job for different sheet ejection mode; and (e) a next job is a job for different sheet ejection destination.

2. The image forming system of claim 1 further comprising:

a detection section to detect that the sheet has been removed from the sheet ejection section; and a setting section for setting a predetermined time between detection by the detection section and restart of the image forming processing, wherein the control section restarts the image forming processing by the image forming section when the predetermined time set with the setting section has passed since the detection time of the detection section, and stops again the image forming processing by the image forming section when the image forming processing reaches the number of units for stop specified with the specify section after the restart.

3. The image forming system of claim 1 further comprising:

a detection section to detect that the sheet has been removed from the sheet ejection section; and an instruction section to instruct the image forming section to restart the image forming processing, wherein the control section restarts the image forming processing by the image forming section when the detection section detects that the sheet has been remove and the instruction section instructs the image forming section to restart the image forming processing, and stops again the image forming processing by the image forming section when the image forming processing reaches the number of units for stop specified with the specify section after the restart.

4. The image forming system of claim 1 further comprising:

a detection section to detect that the sheet has been removed from the sheet ejection section;

an instruction section to instruct the image forming section to restart the image forming processing;

a first setting section for setting a predetermined time between detection by the detection section and restart of the image forming processing; and a second setting section for setting any of a first control by which the image forming section restarts the image forming processing when a predetermined time set with the first setting section has passed, and a second control by which the image forming section restarts the image forming processing when the detection section detects that the sheet has been removed and the instruction section instructs the image forming section to restart the image forming processing, wherein in the case that the first control is set with the second setting section, the control section restarts the image forming processing by the image forming section when the predetermined time set with the first setting section has passed since the detection time of the detection section, in the case that the second control is set with the second setting section, the control section restarts the image forming processing by the image forming section when the detection section detects that the sheet has been removed and the instruction section instructs the image forming section to restart the image forming processing, and after the restart of the image forming processing by the image forming section, the control section allows the image forming section to stop again the image forming processing when the image forming processing reaches the number of units for stop specified with the specify section.

5. An image forming method comprising the steps of:

performing an image forming processing to form an image on a sheet to eject the image-formed sheet to the sheet ejection section, specifying the number of units for stop in a temporary stop mode in which the image forming processing is temporarily stopped, wherein the number of units for stop specified in the specifying step is at least one of the number of sheets, the number of sets, and the number of jobs, controlling the image forming processing to stop when the image forming processing reaches the number of units for stop specified in the specifying step, wherein in the controlling step, it is judged whether or not a predetermined condition has been met when the number of units for stop specified in the specifying step is the number of jobs, and when it is judged that the predetermined condition has been met, the image forming processing is stopped after ejecting the sheet of a current job and a count of the number of jobs until the stop time is reset, and the predetermined condition is at least one of the following conditions:

(a) a different number of jobs is specified as the number of units for stop in the specifying step;

(b) release of the temporary stop mode has been instructed;

(c) a next job is a job for different sheet size;

(d) a next job is a job for different sheet ejection mode; and (e) a next job is a job for different sheet ejection destination.

6. The image forming method of claim 5 further comprising the steps of:

detecting that the sheet has been removed from the sheet ejection section; and setting a predetermined time between detection in the detecting step and restart of the image forming processing, wherein in the controlling step, the image forming processing restarts when the predetermined time set in the setting step has passed since the detection time in the detecting step, and the image forming processing is stopped again when the image forming processing reaches the number of units for stop specified in the specifying step after the restart.

7. The image forming method of claim 5 further comprising the steps of:

detecting that the sheet has been removed from the sheet ejection section; and instructing restart of the image forming processing, wherein in the controlling step, the image forming processing restarts when it is detected that the sheet has been remove in the detecting step and the image forming processing is instructed to restart in the instructing step, and the image forming processing is stopped again when the image forming processing reaches the number of units for stop specified in the specifying step after the restart.

8. The image forming method of claim 5 further comprising the steps of:

detecting that the sheet has been removed from the sheet ejection section;

instructing restart of the image forming processing;

firstly setting a predetermined time between detection in the detecting step and restart of the image forming processing;

secondly setting any of a first control by which the image forming processing restarts when the predetermined time set in the firstly setting step has passed since the detection time in the detecting step, and a second control by which the image forming processing restarts when it is detected that the sheet has been removed in the detecting step and the image forming processing is instructed to restart in the instructing step, wherein in the controlling step, in the case that the first control is set in the secondary setting step, the image forming processing restarts when the predetermined time set in the firstly setting step has passed since the detection time in the detecting step, in the case that the second control is set in the secondary setting step, the image forming processing restarts when it is detected that the sheet has been removed in the detecting step and the image forming processing is instructed to restart in the instructing step, and after the restart of the image forming processing, the image forming processing is stopped again when the image forming processing reaches the number of units for stop specified in the specifying step.

* * * * *